US008783874B1

(12) United States Patent
Riza

(10) Patent No.: US 8,783,874 B1
(45) Date of Patent: Jul. 22, 2014

(54) COMPRESSIVE OPTICAL DISPLAY AND IMAGER

(75) Inventor: Nabeel A. Riza, Tujunja, CA (US)

(73) Assignee: Nusensors, Inc., Tujunja, CA (US)

( * ) Notice: Subject to any disclaimer, the term of this patent is extended or adjusted under 35 U.S.C. 154(b) by 315 days.

(21) Appl. No.: 13/353,016

(22) Filed: Jan. 18, 2012

(51) Int. Cl.
*G03B 21/28* (2006.01)
*G02B 27/10* (2006.01)
*H01S 3/10* (2006.01)

(52) U.S. Cl.
USPC ............ 353/31; 353/98; 356/462; 348/343; 348/423.1; 359/27; 372/24; 372/38.02

(58) Field of Classification Search
CPC ......... H04N 9/3129; H04N 5/74; H04N 9/31; H04N 5/7458; H04N 13/0235; H04N 9/3161; H04N 13/042; H04N 1/0635; H04N 1/1052; H04N 1/113; H04N 1/32561; H04N 2013/0465; G03B 21/00; G03B 21/2033; G02B 26/10; G04G 9/042; G05B 19/4144
USPC ............ 353/31, 98; 356/462; 348/343, 423.1; 359/27; 372/24, 38.02
See application file for complete search history.

(56) References Cited

U.S. PATENT DOCUMENTS 6,922,233 B2 7/2005 Riza
8,213,022 B1 * 7/2012 Riza et al. ................ 356/609

OTHER PUBLICATIONS

Sumriddetchkajorn, et al., Micro-Electro-Mechanical System-Based Digitally Controlled Optical Beam Profiler, Applied Optics, 2002, pp. 3506-3510, vol. 41, No. 18.

Riza, et al., Digital Micro-mirror Device-based Broadband Optical Image Sensor for Robust Imaging Application, Optics Communications, 2011, pp. 103-111, vol. 284.

Takhar, et al., A New Compressive Imaging Camera Architecture Using Optical-Domain Compression, SPIE, 2006, pp. 606509-1-606509-10, vol. 6065.

Nayar, et al., Programmable Imaging: Towards a Flexible Camera, International Journal of Computer Vision, 2006, pp. 7-22, vol. 70, No. 1.

Riza, et al., Smart Two-Dimensional Laser-Based Display, Journal of Display Technology, 2011, pp. 90-95, vol. 7, No. 2.

Candes, et al., Robust Uncertainty Principles: Exact Signal Reconstruction from Highly Incomplete Frequency Information, IEEE Transactions on Information Theory, 2006, pp. 489-509, vol. 52, No. 2.

(Continued)

*Primary Examiner* — Georgia Y Epps
*Assistant Examiner* — Magda Cruz
(74) *Attorney, Agent, or Firm* — Brian S. Steinberger; Phyllis K. Wood; Law Offices of Brian S. Steinberger, P.A.

(57) ABSTRACT

Methods and systems for a compressive optical display and imager using optical scanning and selection and three-dimensional beamforming optics. Standard pixel data can generate a compressed image data set having custom pixel sizes, locations, and intensities. A 3-D beamformer optic adjusts its focus to produce the largest focused beam spot on the display screen corresponding to an image zone compressed pixel. Using scan mirror angular controls, display image space is painted using minimal numbers of laser beam spots whose sizes depend on the compressed sensed image. The imager includes movable reflecting optics to reflect an optical image and controllable imaging optics to pass the reflected optical image toward a digital micromirror that reflects +/−θ optical beams into +/− θ optical beam paths. A controller controls reflecting optics and agile front end imaging optics to receive an electronic image signal corresponding to detected +/−θ optical beams.

12 Claims, 4 Drawing Sheets

(56) References Cited

OTHER PUBLICATIONS

Baraniuk, Compressive Sensing, IEEE Signal Processing Magazine, 2007, pp. 118-124.

Lashmet, et al., A Single-Mirror Laser-Based Scanning Display Engine, Projection Displays Issue, 2008, vol. 24, No. 12.

Donoho, Compressed Sensing, IEEE Transactions on Information Theory, 2006, pp. 1289-1306, vol. 52, No. 4, abstract.

Davis, et al., MEMS-Based Pico Projector Display, Proceedings of IEEE/LEOS Optical MEMS and Nanophotonics, 2008, pp. 31-32, abstract.

* cited by examiner

COMPRESSIVE OPTICAL DISPLAY AND IMAGER

FIELD OF THE INVENTION

An optical display that creates an optical image from electronic data while an optical imager creates an electronic image from optical data. In both cases, data is engaged with an optical device called an imager or a display. This invention relates to optical displays and imagers and, in particular, to methods and systems for achieving data compressed display and imager devices.

BACKGROUND AND PRIOR ART

Optical displays include laser scanned display fields. A period of rapid growth and change in the display industry has recently given rise to many new display technologies. W. Davis et. al. "MEMS-Based Pico Projector Display," Proceedings of IEEE/LEOS Optical MEMS & Nanophotonics, Freiburg, Germany, (2008) discloses a unique application of micro electromechanical systems to the area of projection displays. Davis describes a representative example of a DMD-based projection display engine, the digital display engine. The digital display engine is based on a single-DMD device having array dimensions of 800600 elements, illuminated by a metal halide arc lamp through a compact optics train. The engine is designed for portable and fixed conference-room graphics and video display applications. Another example of a digital display engine is described in Lashmet et al, "A Single-Mirror Laser-Based Scanning Display Engine," December 2008 Vol. 24, No. 12, Projection Displays Issue.

A problem with the prior-art laser scanning projection displays is that the farther the distance of the screen from the laser scan optics, the poorer the spatial resolution of the image due to the natural diffraction-based spreading of the Gaussian laser beam that forms the individual pixel/spot in the pixelated display.

Ideally, a laser scanning projection display that uses the lowest data overhead and produces the fastest frame rate with minimal power consumption would be advantageous. Laser scanning-based displays operate within a fixed image format produced by scanning a fixed N×M number of laser pixel spots on the screen. So regardless of the content of the image to be displayed, the laser scanning display physically scans all the N×M laser spots on the screen during. In addition, for grayscale control, the laser power is modulated to all N×M pixel positions. When N×M=1 million pixels, there is a high data overhead to operate the laser scanning display that requires laser beam motion via mirror scan options to one million angular space positions. As a result there is a tremendous hardware burden on the operational scan range and resolution of the scan mirror optics plus the control electronics for the laser and mirrors.

It is well known that typically images have some regions that are content rich while other regions in the image have a constant background. Compressive sensing is a new paradigm in imaging systems where one cleverly keeps the useful image data while discarding other image content as described in E. J. Candes et al., "Robust Uncertainty Principles: Exact Signal Reconstruction from Highly Incomplete Frequency Information," IEEE Trans. Information Theory, Vol. 52, No. 2, February 2006; D. Donoho, "Compressed sensing," IEEE Trans. Info. Theory, Vol. 52, No. 4, April 2006 and by R. G. Baraniuk, "Compressive Sensing," IEEE Signal Proc. Mag., Vol. 118, July 2007.

In prior-art laser scanning displays, as the screen distance increases, the display pixel size gets larger due to beam diffraction and hence the image quality gets worse for larger screen distances and display image sizes. A compressive optical display was not possible with prior art displays because independent pixel size control was not possible given the fixed nature of the pixelated photo-sensor chip or the not-controllable laser beam spot size of prior-art laser scanning displays.

To solve the problems associated with the prior art laser scanning displays, the present invention provides a novel laser scanning-based optical display that operates as a compressive optical display by using the few custom compressed sensed image data pixels in the image space by electronically programming the laser spot beam to desired spot beam sizes, shapes, and locations. This results in a drastic reduction in number of individual scan spots results, thus increasing the display frame rate and reducing overall display power consumption.

The DMD is a powerful device not only for displays but also for realizing novel imaging methods as shown in the prior arts: S. Sumriddetchkajorn and N. A. Riza, "Micro-Electro-Mechanical System-Based Digitally Controlled Optical Beam Profiler," Applied Optics-LP, Vol. 41, Issue 18, Page 3506 (June 2002); N. A. Riza, "Digital optical beam profiler," U.S. Pat. No. 6,922,233, Jul. 26, 2005; Shree K. Nayar and Vlad Branzoi, "Programmable Imaging Towards a Flexible Camera," International Journal of Computer Vision, Vol. 70, No. 1, pp. 7-22, 2006; Dharmpal Takhar, Jason N. Laska, Michael B. Wakin, Marco F. Duarte, Dror Baron, Shriram Sarvotham, Kevin F. Kelly, Richard G. Baraniuk, "A New Compressive Imaging Camera Architecture using Optical-Domain Compression," Computational Imaging IV, edited by Charles A. Bouman, Eric L. Miller, Ilya Pollak, Proc. of SPIE-IS&T Electronic Imaging, SPIE Vol. 6065, 606509, 2006; Nabeel A. Riza, Syed Azer Reza and Philip J. Marraccini, "Digital Micro-Mirror Device-based Broadband Optical Image Sensor For Robust Imaging Applications," Elsevier Optics Communications Journal, appeared on-line, Sep. 1, 2010; and N. A. Riza, "Agile optical image sensing, control, and measurement modules," U.S. patent application Ser. No. 12/938,842 Filed Nov. 3, 2010, which is incorporation by reference. Here, the DMD is used with a maximum of two point detectors per wavelength band to acquire the incident optical irradiance pattern. Hence this imager can be considered a time sequential or serial design imager as one scans the entire image on a per pixel/point detector basis to acquire the full multi-pixel incident image. The method does provide high optical dynamic range but can be temporally slower and also have limited overall pixel count given the per DMD/CCD pixel or point-like data acquisition design.

SUMMARY OF THE INVENTION

A primary objective of the present invention is to provide methods and systems for a highly data compressive optical devices.

A secondary objective of the present invention is to provide methods, systems and for a compressed data laser scanning display device.

A third objective of the present invention is to provide methods, systems and for a compressed data optical imager device.

A fourth objective of the present invention is to provide methods and systems for a compressive design for a two-dimensional (2-D) optical display device using 2-D laser scanning and smart three-dimensional (3-D) beamforming optics.

A fifth objective of the present invention is to provide methods and systems for a 2-D compressed data laser scanning display device configuration that can be extended to one-dimensional (1-D) and three-dimensional (3-D) displays A sixth objective of the present invention is to provide methods, systems and devices for a compressive laser scanning displays where a laser beam (or three in-line laser beams, one for red, one for green, and one for blue color) are scanned in 2-D space by scanning so the human eye on temporal integration in-directly sees a 2-D image on the projection screen or directly on the human retina. Each laser is independently temporally modulated in order to produce color and gray-scale in the pixelated display.

A seventh objective of the present invention is to provide methods, systems and devices for an energy efficient compressive optical display having applications in entertainment, academic, industrial environments, and for medical instruments.

An eighth objective of the present invention is to provide methods, systems and devices for a powerful compressive display that allows the formation of novel image designs using minimal data overheads and incorporating human visual perception effects, time modulation within the human neural processing centers for visual processing, and the possibility of very large size display screens realized at fast frame rates.

A ninth objective of the present invention is to provide methods, systems and devices for a compressive display that is energy efficient since minimal scan spots are implemented to realize the displayed image.

A tenth objective of the present invention is to provide methods, systems and devices for a hybrid parallel-serial scan smart compressed optical imager design using a DMD, dual-point photodetectors, and small pixel count CCD/multi-detector imaging sensors.

A compressive laser-based optical display embodiment can include a two-dimensional laser scanning system coupled with a programmable three-dimensional beam forming optics and an x-y scan mirror to scan a display screen, a standard format pixel image data, an image processing device to process the standard format pixel image data to implement compressed sensing signal processing operations to generate a compressed sensed image data, and a control processor to control an operation of the three-dimensional beam forming optics, x-y scanning mirror and two-dimensional laser scanning system to scan the display screen to display a Q-pixel image according to the compressed sensed image data.

The standard format pixel data can include a pixel data content input image from one of an optical imaging device and a computer image generation system.

The two-dimensional laser scanning system can include at least one laser sources each producing a laser beam, and a beam combining optics for combining the laser beans from the at last two laser sources. The at least two laser sources can include a first laser source to produce a red laser beam, a second laser source to produce a green laser beam, and a third laser source to produce a blue laser beam.

The three-dimensional beam combining optics can include a wavelength divisional multiplexing device to combine the red, green and blue laser beams.

The three-dimensional beam combining optics can include a collimating lens, and an electronically controlled analog-digital variable focus lens.

The compressed sensed image data can include plural Q-pixel data each having a custom pixel size, display screen location, and intensity.

The display embodiment can include a laser beam spot pixel size can be determined by a laser beam propagation diffraction process and increases as the display screen moves away from the two-dimensional laser scanning system coupled with three-dimensional beam forming optics.

The three-dimensional beam forming optics can include a programmable variable focal length lens, wherein control signal from the control processor adjusts the programmable variable focal length lens focus to produce a focused beam spot on the display screen corresponding to an image zone compressed pixel that represents the compressed sensed image data from the image processing device.

The image processor can generate three different custom pixel size, display screen location, and intensity for each of red, green and blue lasers within a two dimensional image space.

The programmable three-dimensional beam forming optics can include two independently controlled variable focus cylindrical lenses.

The programmable three-dimensional beam forming optics can include a 2-dimension fully phase programmable spatial light modulator selected from an optically addressed phase-only liquid crystal spatial light modulator or a piston-type micro electromechanical system (MEMS) deformable mirror spatial light modulator.

The display screen can be selected from a group consisting of an ellipse display screen, a circular display screen, a curved display screen or a conformal surface display screen.

The two-dimensional laser scanning system coupled with a programmable three-dimensional beam forming optics can include a one color laser source and an electronically controlled analog-digital variable focus lens.

A method for compressive laser-based optical display can include the steps of providing a pixel image data, scanning a display screen with that image data passed through a two-dimensional laser scanning system that is coupled with a programmable three-dimensional beam forming optics and an x-y scan mirror, processing the pixel image data at an image processing device to implement compressed sensing signal processing operations to generate a compressed sensed image data, and controlling an operation of the three-dimensional beam forming optics, x-y scanning mirror and two-dimensional laser scanning system to scan the display screen to display a Q-pixel image according to the compressed sensed image data.

A compressed data optical imager system can include a movable reflecting optical device to reflect an optical image, a controllable agile frontend imaging optics to provide an electronically controlled variable focal length optical path to pass the reflected optical image toward a digital micromirror device, the digital micromirror device reflecting a+$\theta$ optical beam and a−$\theta$ optical beam, an a+$\theta$ optical beam path and a−$\theta$ optical beam path to detect the +$\theta$ optical beam and −$\theta$ optical beams at two different wavelength bands, and a microprocessor based controller to execute a set of instructions to control the movable reflecting optical device and agile frontend imaging optics and receive an electronic image signal corresponding to a detected +$\theta$ optical beam and −$\theta$ optical beams at the two different wavelength bands.

The agile frontend imaging optics can include a movable reflecting optical device to reflect an input optical image, and an imaging lens serially coupled with an electronically controlled variable focus lens that provides a variable focal length by electronic control.

The +θ optical beam path and −θ optical beam path can each include a first beamsplitter to separate the +θ optical beam at a first wavelength from the +θ optical beam at a second different wavelength, a second beamsplitter to separate the −θ optical beams at a first wavelength from the −θ optical beams at a second different wavelength, and a first and second photodetector to detect each of the +θ optical beam and −θ optical beams at the first wavelength and the +θ optical beam −θ optical beams at the second different wavelength and produce the electronic image signal in response to the detection.

The photodetector in each of the +θ optical beam path and −θ optical beam path can include a single or point photodetector that detects single pixel optical data from the corresponding first wavelength +θ optical beam or the −θ optical beams, and a multi-detector image sensing path having a multi-detector imaging sensor to detect a subset of the digital micromirror device image data from the corresponding second wavelength +θ optical beam or −θ optical beam.

The multi-detector imaging sensor can be one of a multi-pixel imager and a field programmable detector array to detect plural pixels simultaneously.

The multi-detector sensing path can include an imaging lens to transmit the corresponding second wavelength +θ or −θ optical beam via a beam path mirror set where control of two mirror tilt angles of the mirror set physically translates the digital micromirror device selected optical image in two dimensions to place the selected optical image over a multi-detector imaging sensor.

The microprocessor based controller can control a binary state micromirror tilt angle in time to control a selected image pixel detector integration time for a fixed integration time multi-detector imaging sensor.

The digital micromirror device can operate in a single pixel serial-scan mode for high dynamic range processing and smart sensing.

The smart sending can include a compressed data image edge detection.

The microprocessor based controller can control time modulation of an on/off state of the digital micromirror device micromirrors in the single pixel serial scan mode to control a time duration of the on state light incident on the multi-detector imaging sensor to improve a dynamic range of the compressed data optical imager.

The digital micromirror device can operate in a multiple-pixel parallel mode for parallel image processing wherein when a selected subset of an original image on the digital micromirror device is selected and observed by the multi-detector imaging sensor for high speed parallel scan operations with image data compression.

The microprocessor based controller can control time modulation of an on/off state of the digital micromirror device micromirrors in the multiple-pixel parallel mode to control a time duration of the on state light incident on the multi-detector imaging sensor to improve a dynamic range of the compressed data optical imager.

The set of instructions can includes a first subset of instructions to introduce a relative time delay amongst the photodetected electrical signals in to study a time scanned optical irradiance data from the image to deduce image effects.

The second set of instructions can include a subset of instructions to control the digital micromirror device as a 1×2 freespace optical switch to activivate one or more detection ports of the multi-detector imaging sensor and select a wavelength of operation of the selected for operation of the multi-detector image sensing path.

Further objects and advantages of this invention will be apparent from the following detailed description of preferred embodiments which are illustrated schematically in the accompanying drawings.

DESCRIPTION OF THE PREFERRED EMBODIMENTS

Figure 1:
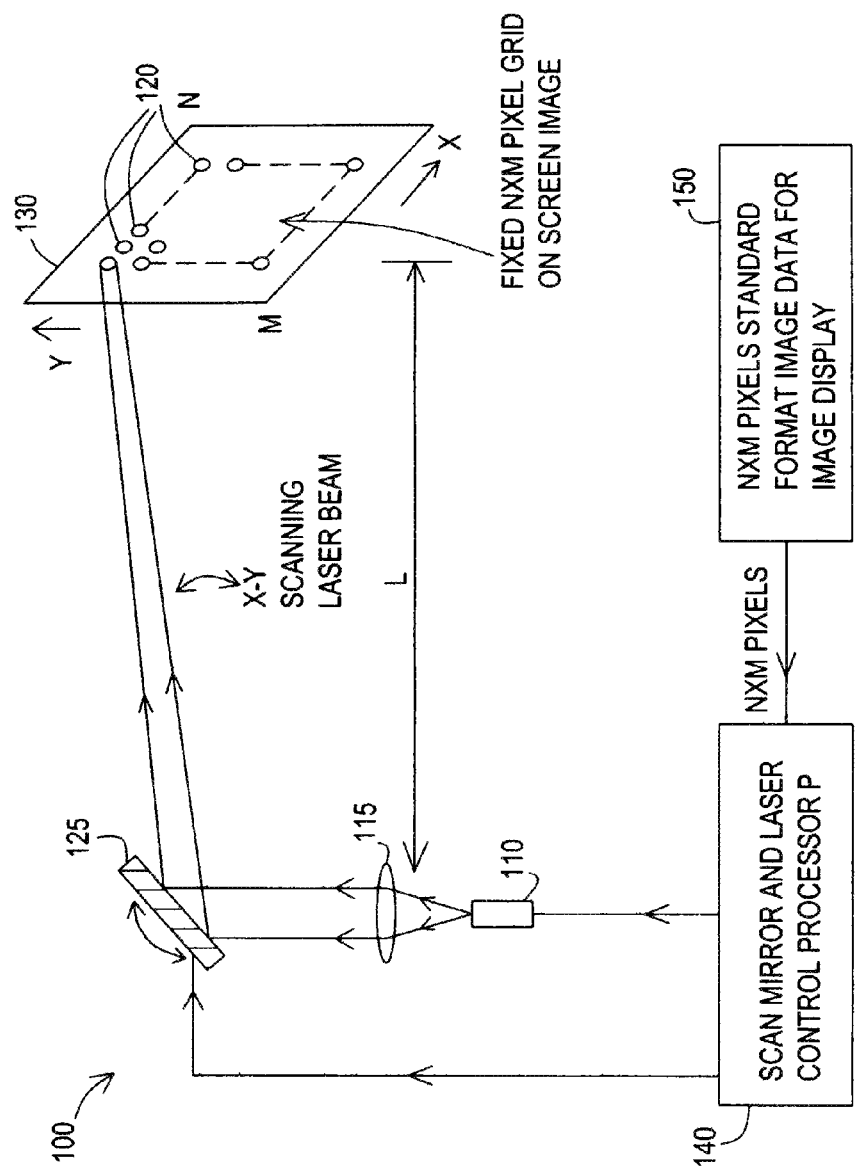
FIG. 1 is a schematic block diagram of a prior art standard laser scanning 2-D display design.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:

100 2-D laser scanning display
110 laser source
115 lens
120 spot beam
125 x-y scan mirror
130 display screen
140 control processing device
150 compressed image processor
160 image data
200 compressive laser scanning display
210 laser source
215 lens
220 spot beam
225 x-y scan mirror
230 display screen
240 control processing device
245 hybrid electronic lens
250 compressed image processor
260 image data
300 compressive color laser scanning display
305 lens
310 laser source
312 laser source
314 laser source
315 lens
320 spot beam
325 x-y scan mirror
330 display screen
340 control processing device
345 hybrid electronic lens
350 compressed image processor
360 image data
370 wavelength division multiplexer 400 compressed data optical imager
x-y scan mirror
420 ECVFL
425 imaging lens
435 photo-detector
440 digital micromirror device
450 collection mirror
455 beamsplitter
460 imaging lens
463 mirror
465 mirror
470 multi-pixel imager
480 collection lens
482 beam splitter
484 photo-detector
486 imaging lens
488 mirror
490 mirror
495 multi-pixel imager
500 control processor
510 image display In a related publication N. A. Riza and S. A. Reza, "Smart Agile Lens Remote Optical Sensor for Three Dimensional Object Shape Measurements," Applied Optics, Vol. 49, No. 8, Mar. 10, 2010, the inventor disclosed how an electrically programmed variable focus lens can be used to form a three dimensional shape sensor that uses the smart laser beam spot size control of varying sizes matched to the target to realize a compressed sensing imager. In another recently published article, N. A. Riza and P. J. Marraccini, "Smart Two Dimensional Laser-based Display," IEEE Journal of Display Technology, (February 2011), the inventor disclosed a smart laser scanning display that continues to provide the highest spatial image resolution (i.e., pixel size) for changing screen distances from the laser and scanning optic hardware. In prior-art laser scanning displays, as the screen distance increases, the display pixel size increases due to beam diffraction and hence, the image quality decreases for larger screen distances and display image sizes.

Ideally, an optical display should use the least data control information overhead to produce the desired displayed images. Because today's classic projection display hardware using both laser scanning based displays and spatial light modulator and liquid crystal displays have a fixed pixel count and fixed pixel count on the SLM chip, hardwired pixels in the image are programmed and used. The true power of compressed sensing cannot be realized by SLM projection displays because all N×M pixels on the SLM chip must be programmed to produce the desired image. On the other hand, the spatially smart laser scanning display design developed by the inventor is amenable to implementing compressive display according to the present invention.

Specifically, the smart laser scanning display for a given fixed screen distance can be programmed to operate in a compressive mode by controlling the scan angle mirrors and focus/defocus lens focal length to produce the desired minimal laser beam spots to form the desired image. A compressing sensing operation is performed electronically via a computer image processor on the desired raw image to produce a compressed image and its relevant mirror control and electronic lens focus/defocus values to produce the desired displayed image with minimal mirror independent scans. In addition, the laser power for these few pixels is also controlled to provide the gray-scale image data.

The present invention provides compressive design methods and systems for a two-dimensional (2-D) optical display using 2-D laser scanning and smart three-dimensional beamforming optics. The standard high pixel data content input image from an optical imaging device or computer image generation system is processed by an image processor that implements the signal processing operations of compressed sensing to generate a new compressed sensed image data set to be viewed via the laser-based display of the present invention. Using the new compressed sensed image data, the equivalent custom pixel sizes, locations, and intensities are generated by the compressive optical display.

In the preferred embodiment, the display screen is at a given fixed distance from the laser source and scanning optics. An electrically programmable 3-dimensional beamformer optic, such as a programmable variable focal length lens, adjusts its focus to produce the largest focused beam spot on the display screen corresponding to a particular image zone compressed pixel that represents the compressed sensed image data.

Using the scan mirror angular controls and focus/defocus control via the programmable focus lens, the display image space is painted using the minimal number of laser beam spots whose sizes depend of the specifics of the compressed sensed image. Thus a compressive laser-based optical display with the fewest pixel spots is formed leading to a faster frame rate display operation with the smallest image and display data overhead and power consumption. The technique applies to color curved screen displays.

For background, FIG. 1 shows the prior art standard single color laser scanning 2-D display 100 where the laser beam spot 120 size is fixed for the entire scanning zone on the display screen 130 shown at any given fixed screen distance of L. The laser's beam 110 is collimated by the lens 115. The laser beam spot pixel size is determined by the laser beam propagation diffraction process and increases as the screen moves away from the laser 110 and scan mirror optics 125.

For example, the image to be produced has been specified to be in a given image format with N×M pixels. As shown, N pixels are along the x-direction of the image on the display screen 130 and M pixels are along the y-direction of the image on the display screen 130. For example with N=1000 and M=750, there are 750,000 pixels in the display image on the screen 130. This also means N×M independent laser beam scan angles are produced by the x-scan and y-scan of the x-y scan mirror 125. In this case, N=1000 scan angles must be produced in the x-angular direction and M=750 scan angles must be produced in the y-angular direction. As a result, the scan requirements for the mirror 125 and scan mirror controls 140 are intensive and complex, requiring extra processing and control data to be provided by the control processor 140. In addition to scan data, the laser 110 power for each pixel location must be provided and controlled by the processor 140.

Given a full color display with the three colors, i.e., red, green and blue, three lasers are required which also means that three different M×N laser intensity modulation control signals must be computed, stored and provided to drive the laser electronics. For example, 2,250,000 laser power levels would be required to produce a single image frame from the prior-art laser scanning display. It is clear that the prior-art laser scanning display pays a heavy price for the control data overhead to produce an image on the screen. The processor 140 generates the required mirror 125 and laser 110 control signals to produce the laser beams at the correct pixel locations on the screen, each with the correct optical power level.

Alternatively, the desired image can come from a classic image capture device such as a CCD or CMOS camera or other optical (e.g., IR, TeraHertz, visible, etc bands) imaging device in the infrared, TeraHertz, visible, or other bands or may be computed by an electronic image generator. These imaging devices traditionally provide a classic N×M pixel format image with light image irradiance information stored on a pixel by pixel basis. Most images contain vital image information that are distributed image zones and a typical image contains redundant image data in many zones of the image. Compressive sensing is a new paradigm that mathematically operates on an image to produce a new image with a minimal amount of redundant image data.

The compressive sensing operation can be implemented using an algorithms and electronic image processor to produce the compressed image. On the other hand, the compressive sensing can be directly implemented within the optical imaging hardware as described in Dharmpal Takhar, et al., "A New Compressive Imaging Camera Architecture using Optical-Domain Compression," Proc. of SPIE-IS&T Electronic Imaging, SPIE Vol. 6065, 606509, 2006 and in N. A. Riza and H. Foroosh, Hybrid Differential Optical Sensing Imager, co-pending U.S. Prov. Patent Application 61/314,374, filed on Mar. 16, 2010 by the same inventor.

In the present invention, a compressed sensed image is provided to an image storage device that keeps the reduced image data set for eventual display by another display device such as the compressive laser scanning display of the present invention. In addition, the compressive laser scanning display can be fed by a compressed image from the electronic image processor. In both cases, the compressed image is processed by an image processor that computes the required pixel formation signals for the image to be displayed by the scanning laser on the screen. By electronically processing the compressed image, a new pixel set is produced where the pixel size, location, and irradiance values. The three different values per three different colors of lasers within the two dimensional image space are assigned to produce the desired image on the screen by using a minimal number of laser beam spots.

These spots can also be asymmetric if the appropriate programmable beamforming optic are used to condition the laser pixel spot size and shape. For example, two independently controlled variable focus cylindrical lenses or a 2-dimension fully phase programmable spatial light modulator, such as an optically addressed phase-only liquid crystal spatial light modulator or a piston-type micro electromechanical system (MEMS) deformable mirror spatial light modulator, are used to condition the laser pixel spot size and shape.

Laser spots of different sizes, shapes and irradiances that fill the 2-dimension image display map on the screen can be imaged to form the required compressive image and hence a compressive display system. The non-linear response of the human visual perception of images can be taken advantage of to produce high quality images despite the fact that the image has been stitched by using variable pixel sizes and pixel shapes. Because the data control overhead on the drive electronics for the compressive laser scanning display is reduced due to the compressive allocations of pixel sizes, shapes, and locations versus a traditional fixed pixel size laser scanning display, the compressed display images can be produced at a faster rate than with classic laser scan displays. When image data is already known, such as a pre-recorded movie or video, and not in real-time, the required compressive display control signals can be stored and used to drive the compressive display. On the other hand, when image data is being provided in real-time for display, then fast dedicated custom electronic and/or optical processors that implement the compressive sensing are required either direct or indirectly, along with the control signal generating processor.

It is not necessary for the display screen to be the standard flat rectangular screen. In fact, the proposed compressive display allows the use of any shape for the screen like an ellipse or a circle or some other shape including a curved or conformal surface. Hence, the screen does not have to be flat, hence can be curved to help with 3-D visualizations. This feature is again possible because of the focus/defocus control of the laser beam that forms the scan spot on the screen.

Figure 2:
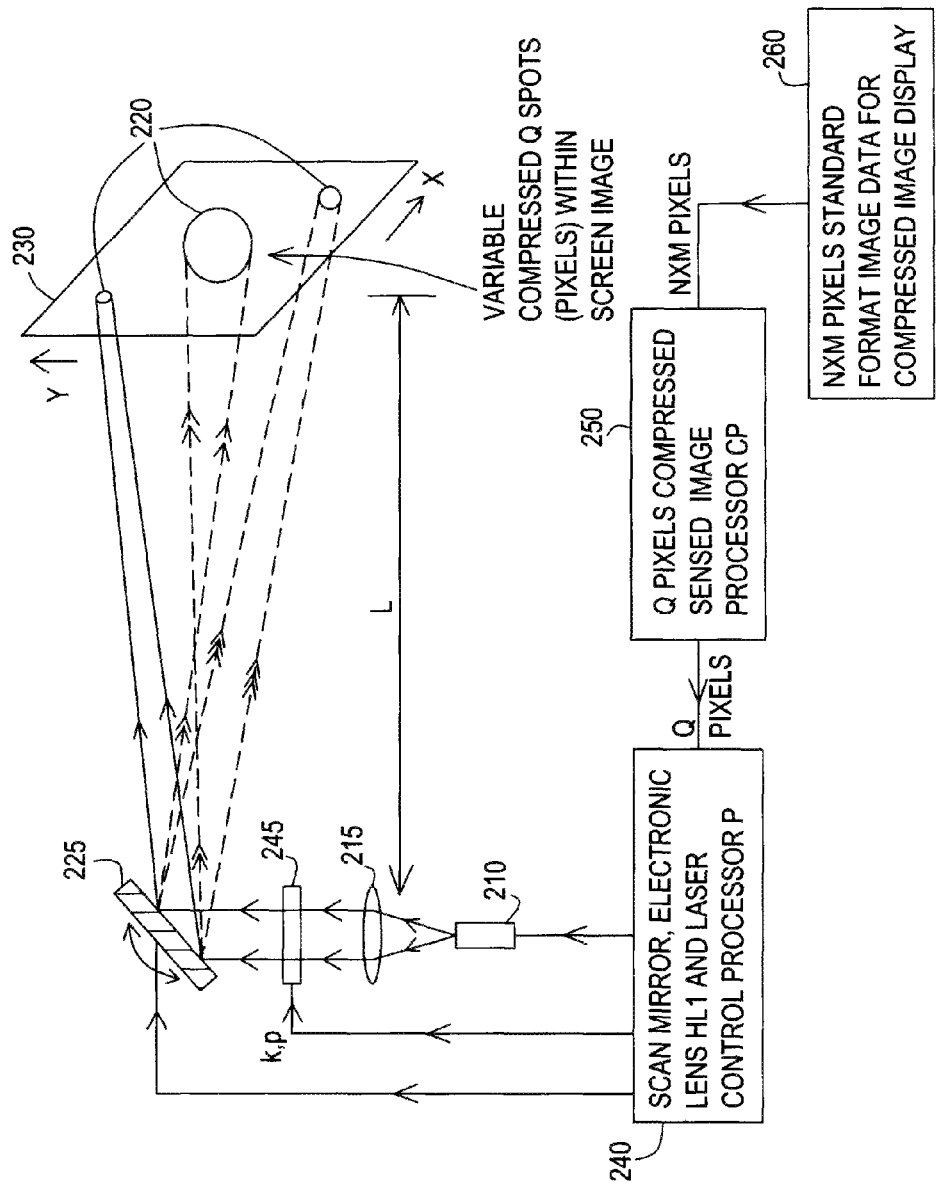
FIG. 2 is a schematic block diagram of an embodiment of the compressive laser scanning 2-D display design using one 3-D beamforming optic, e.g., one programmable Hybrid Lens (HL) that forms an analog-digital variable focus lens and one x-y scan mirror.

FIG. 2 is a schematic block diagram showing the preferred embodiment of the compressive laser scanning 2-dimensional display using one color laser 210 and an electronically controlled analog-digital variable focus lens 245. The electronically controlled analog-digital variable focus lens 245 can be a single 3-dimensional beamforming optic device. For a full color display, collimated laser beams from the red (R), green (G), and blue (B) lasers are combined using wavelength beam combining optics such as a wavelength division multiplexer device (not shown in FIG. 2) to then pass through the electrically programmable Hybrid Lens 245 and a 2-D scanning mirror 225 to head towards a display screen 230. Two independent scan mirrors for x and y scans can also be used instead of a single x-y scan mirror 225.

For example, FIG. 2 shows three laser spot (pixel) beams on the screen, all with different sizes and locations that are required to construct the compressed sensed Q-pixel image on the display screen. The hybrid lens 245 is made up of a variable focal length digital lens and a cascaded variable focal length analog lens to form a high dynamic range and high resolution variable focal length laser beam focus/defocus conditioning optical system.

As shown, the compressive optical display includes a memory to store N×M pixel standard format data 260 that is used by the compressed sensed image processor to generate plural Q pixels of image data. Each Q pixel has a variable size, shape and irradiance. A second processing device 240 is used to generate control signals for the scanning mirror 225, the hybrid lens 245 and the laser 210 to scan the display screen 230 with the Q pixel data.

The digital lens of the hybrid lens is controlled by a control signal k that varies from k=1, 2, 3, to K, producing K different focal length positions for the laser beam engaging the given location display screen. The focal length resolution of the variable digital lens is designed to be equal to the analog lens variable focus range of "1" where $1 = p\Delta 1$ with $p = 1, 2, 3, \ldots, P$. Thus the AL has P different focus positions. In total the hybrid lens 245 can produce K times P variable focal length positions implying a possible K×P independent laser beam spot sizes 220 on the display screen 230.

In effect, both a high dynamic range and high resolution laser scanning spot beam pixel size is possible as the digital lens gives the pixel size dynamic range control while the analog lens gives the pixel size fine resolution control. Depending on the input image, all or some of the K×P states of the hybrid lens 245 can be used to produce the desired Q spot beams 220 on the display screen 230. K×P Q spots is expected to be much less than N×M pixels of the original input image. The hybrid lens focal length can be adjusted by electronic control processor 240 so that the laser beam forms the desired size beam waist or focused beam spot 220 on the display screen 230 located at the known distance L. The compressed sensed image mapping to the required laser power and pixel size and shape control signal are computed by the computer processor 240. The control processor 240 is fed, indirectly or directly by the compressed sensed imaging input device processor 250 to provide the required Q pixels. The compressed sensed image processor 250 is fed by a standard uncompressed sensed N×M pixels image generator 260.

By controlling the x-y mirror scan angles to position each Q pixel and by controlling the focal length of the electronically controlled optic lens 245, the required pixel size, shape, and location are generated with the pixel laser power controlled by the laser drive signal. This process is repeated for the Q pixels that are stitched within the display screen at this given screen distance L to form a preferred embodiment of the compressive optical display.

A compressive optical display was not possible with prior art displays because independent pixel size control was not possible given the fixed nature of the pixelated photo-sensor chip or the not-controllable laser beam spot size of prior-art laser scanning displays. Hence a powerful compressive display is realized that can allow the formation of novel image designs using minimal data overheads and incorporating human visual perception effects, time modulation within the human neural processing centers for visual processing, and the possibility of very large size display screens realized at fast frame rates. The compressive display can become a medical instrument for new visual biological studies.

The configuration shown in FIG. 2 can be modified as a laser scanning 2-D display design using three independent 3-dimensional beamforming optics, e.g., 3 liquid lenses, for the 3 different color lasers, a full color compressive laser scanned display is also possible. This method can be useful when the programmable lenses have higher chromatic or color sensitive effects than desired that can lead of different beam sizes at the screen for the red, green, and blue colors for the same drive conditions for the hybrid lens. Hence, for optimal compressive display performance, a separate hybrid lens lenses is used for the different color laser beams. So programmable lenses hybrid lens 1, hybrid lens 2 and hybrid lens 3 are used for laser colors Green, Red, and Blue, respectively. Note that each hybrid lens is controlled by its independent electronic control signal from the processor 240. An optional beamforming fixed optic, such as a cascade of fixed focal length diverging/converging lenses, can be used to condition the laser beams for optimal screen distance ranges.

Alternatively, it is also possible to use parallel simultaneous laser scanning beams to scan the display screen. In this case, each laser beam path should have its own hybrid lens and light intensity modulation control. In another example, a single color laser can be used that is first split into multiple beams with each beam passing through an independent light intensity modulator and then a corresponding hybrid lens. In yet another example, three different color laser can be used for red, green, and blue in the same design. By using multiple simultaneous laser scanning beams, a faster frame rate for the display can be achieved. Given the maturity of optical MEMS technology, one can envision the electronically programmable MEMS beamforming optics, the hybrid lenses, MEMS scanning mirrors, and MEMS light intensity modulators (typically at MHz or slower modulation rates) all being used to design the proposed compressive display system.

Figure 3:
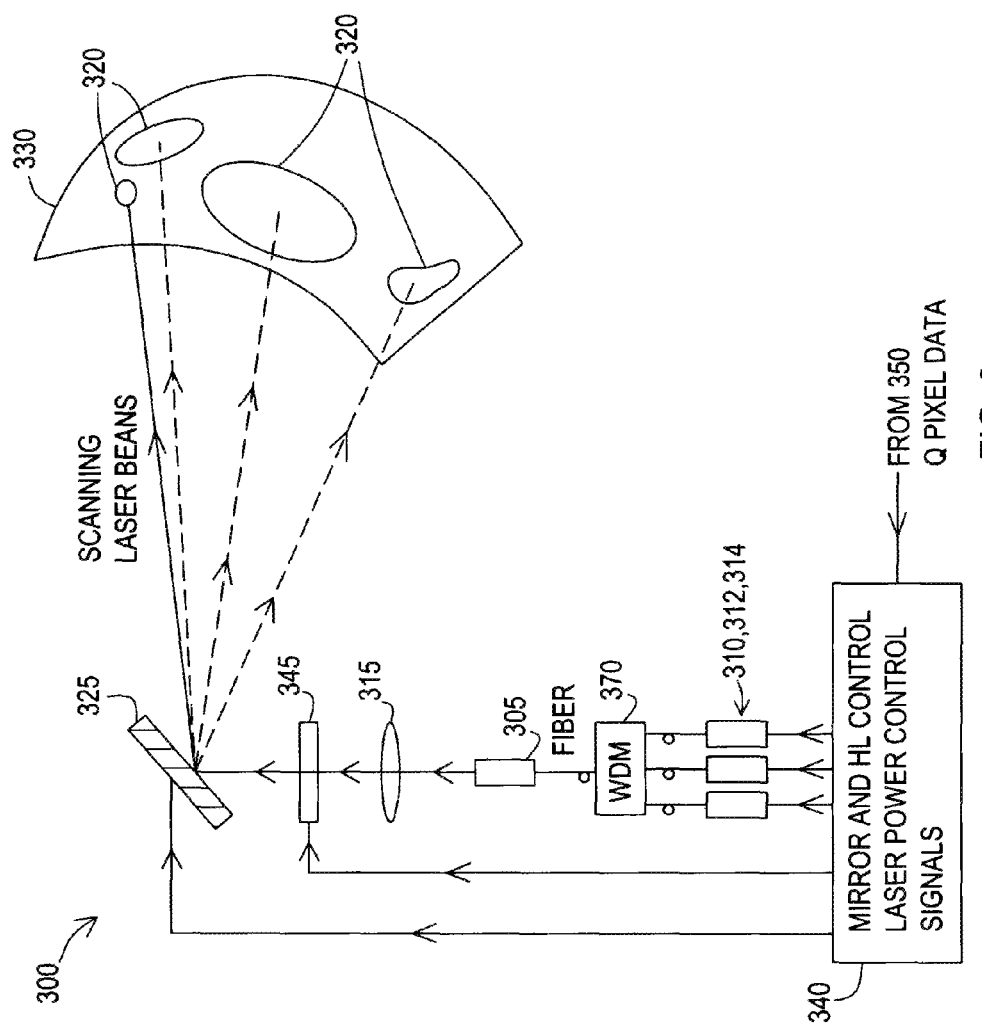
FIG. 3 is a schematic block diagram of another embodiment of the compressive color laser scanning 3-D conformal display illuminated screen showing different pixel sizes, shapes, and locations plus shape and curved display screen. The design is shown for a color display using a Wavelength Division Multiplex device.

An embodiment of the compressive color laser scanning 3-D conformal display 300 with illuminated curved or conformal screen 330 showing different pixel sizes, shapes, and locations on the curved display screen 330 that fill the screen 330 to form a Q-pixel image is shown in FIG. 3. The configuration shown is shown for a color display using a 3 channel Wavelength Division Multiplexing device 370 that combines the optical signals from the red laser 310, green laser 312, and blue laser 314 that are independently time modulated for optical laser power controls.

FIG. 3 shows that a compressive sensed image can be constructed on the display screen using a variety of different pixel 320 shapes and sizes to illuminate the screen to display an image. The specifics of these Q pixels in terms of color, shape, and location is determined by the processor 350 that analyzes the compressed sensed image from the original regular N×M pixel format image. As with the embodiment shown in FIG. 2, the original N×M pixel format image data is processed and compressed into a Q-pixel image at the image processor (not shown in FIG. 3) and the control processor 340 uses the compressed image Q-pixel data to control the scan mirror, the electronic lens 345 and the x-y scan mirror 325 to display the Q-pixel image on the display screen 330.

For the compressive display shown in FIG. 2, a variety of different analog lens technologies can be used such as electrically and optically controlled liquid crystal lenses, electrically and mechanically controlled liquid lenses, and micromachined or MEMS-based electrically actuated variable focus optical lenses.

A typical design of a liquid lens is based on the electrowetting process using two different liquids encased in a cavity. A change in voltage causes the boundary of the two liquids to behave as a lens-like curvature. Electrically controlled variable focal length lenses have been used and suggested for use in a variety of applications such as free-space communications, confocal microscopy, optical chip device inspection and height profiling.

Figure 4:
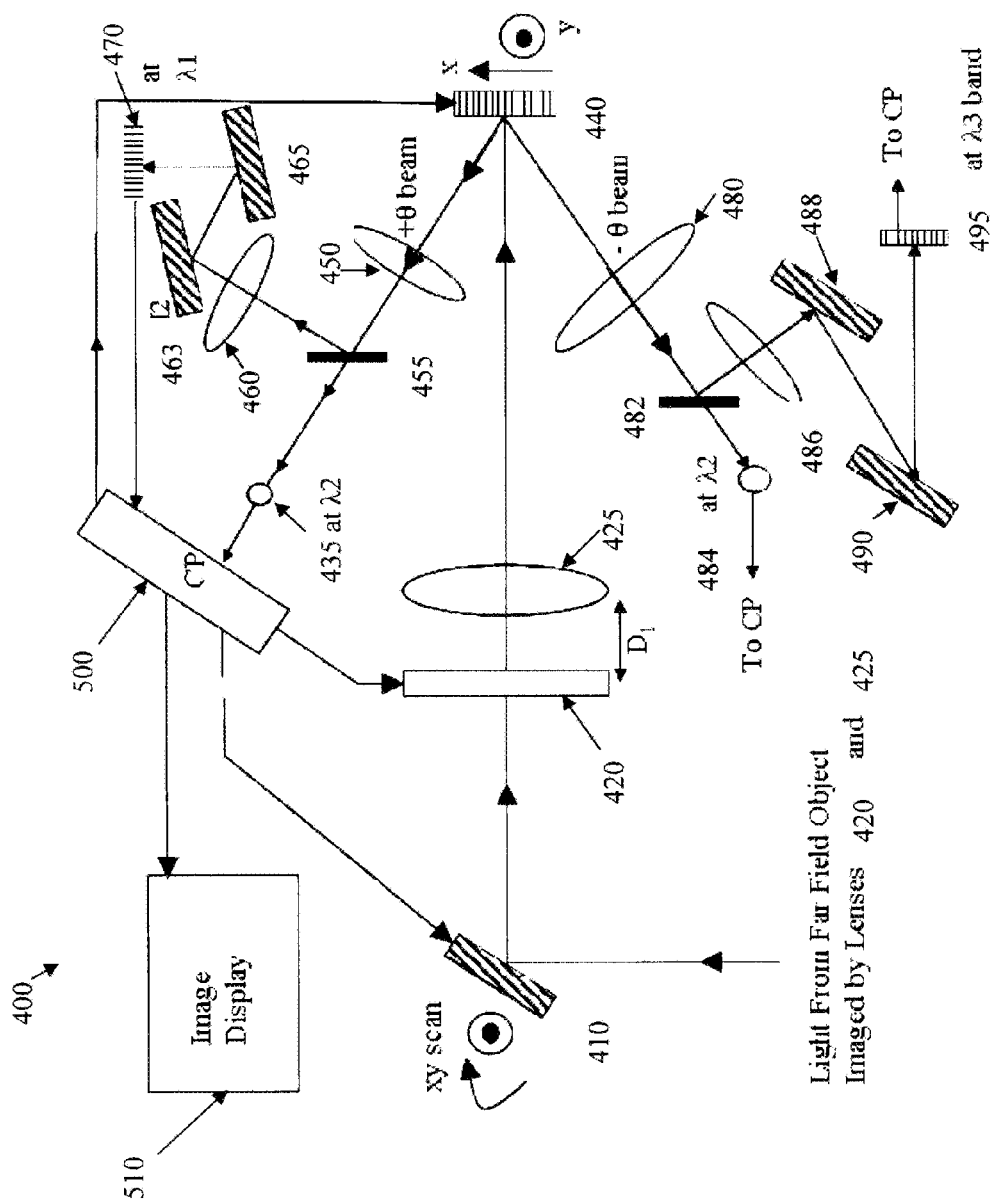
FIG. 4 is a schematic diagram showing the hybrid parallel-serial scan smart compressed data optical imager design.

FIG. 4 shows a schematic diagram of the hybrid parallel-serial scan smart compressed data optical imager design using the DMD, dual-point photodetectors, and small pixel count CCD/multi-detector imaging sensors. The imager design is motivated by the Texas Instruments (TI) specified data indicating that the Digital Micromirror Device (DMD) with aluminum-alloy micromirrors and its glass window can operate with greater than 50% transmission efficiency from approximately 400 nm to approximately 2700 nm and the device has very large pixel count (e.g., approximately 1 million). As a result, the Texas Instrument DMD can be used for broadband applications spanning the visible, NIR, and SWIR bands.

Referring to FIG. 4, the imaging lens 425 along with the optional electronically controlled variable focus lens (ECVFL) 420 functions as the agile frontend imaging optics with the ECVFL 420 providing a variable focal length via electronic control such as a liquid lens. Light from the object plane to the image plane travels via the optional xy-scan mirror 410 to pass through the ECVFL 420 and serial lens 425 to be imaged onto the digital micromirror device DMD 440. The focal length $F_{ECVFL}$ of the ECVFL 420 is adjusted to form an imaging system with the DMD plane being the image plane. As shown, the x-y mirror 410 and variable focused lens 420 are controlled by a central processing unit 500. The focal length $F_{ECVFL}$ depends on the distance between the object plane and the serial ECVFL and lens 425 principal plane forming an image on the digital micromirror device 440 plane.

During serial-mode imager operation or time sequential operations, the DMD 440 provides a moving point sampler scan or pin-hole scan in a 2-dimensional grid to sample the entire irradiance of the image with the selected +θ micromirror 450 state light directed by the micromirrors 440 towards a collection lens 450 and a beam splitter 455 and −θ micro-mirror state light directed by the micromirrors 440 towards a collection lens 480 and a beam splitter 482.

The x-y scan mirror 410 can be used to select a targeted image in the far-field. The + and − light beams reflected by the micromirrors 440 are directed toward + lens 450 and − lens 480 that act as light focusing/collection lenses from the DMD plane and direct the collected light to the single point high speed photo-detectors 435 and 484 that detect the reflected + light beam and the reflected − light beam. The photo detectors 435 and 484 operate both at a given wavelength band like the λ2 band, for example, as shown in FIG. 4. The beamsplitter optics 455 and 482 are dichroic or two wavelength band sensitive devices that physically separate different optical wavelength bands.

The beamsplitter 455 in the + light beam path separates λ2 and λ1 bands and the beamsplitter in the − light beam path separates λ2 and λ3 bands. The λ1 band light or the +θ micro-mirror state are directed to imaging lens 460 via mirrors 463 and 465 to a smaller pixel count multi-pixel imager 470. Similarly, the λ3 band light or the −θ micro-mirror state are directed to imaging lens 486 via mirrors 488 and 490 to a smaller pixel count multi-pixel imager 495. Multi-pixel imagers 470 and 495 acquire sub-set or smaller images from the input large pixel count image of the digital micromirror device 440 at two different optical bands. The photodetectors 435 an 484 acquire single pixel optical data at the same wavelength λ2 that is used for data power calibration. The central processing unit 500 also receives the electronic image signals from the + and − light beam photodetectors 435 and 484. The smaller pixel count multi-pixel imagers 470 and 495 can also be designed to collected data at the same wavelength band, λ1 in the example shown in FIG. 4.

Multi-pixel imagers 470 and 495 selection is deciding the states of the DMD micromirrors 440; hence the DMD micromirrors 440 can be programmed to act as a 1×2 optical freespace switch. The DMD micromirror plane is imaged to the two multi-pixel imager planes using the + and − beam path lens pairs 450/460 and 480/486, respectively. The + and − beam path mirror pairs 463/465 and 488/490 are operated to control the translation of the DMD micromirrors 440 selected image onto the multi-pixel imager planes. This is because the multi-pixel imager 470 and 495 is a smaller pixel count sensor while the DMD micromirror 440 has a large pixel count− the image sensing compression operation. Hence, a sub-set of the DMD micromirror pixels can be transferred to each multi-pixel imager 470 and 495. To construct the full image incident on the DMD micromirror 440 plane, the DMD micromirror 440 selects small pixel sets from the incident image on the DMD and then translates these images in space so they cover the full pixel count of the multi-pixel imager 470 and 495. Hence, the imager can be operated in a parallel optical image acquisition mode.

The choice of which scan mode to use (serial or parallel) can be determined by various means that includes an intelligent control system (e.g., can decide image compression/segmentation methods) for the DMD micromirror that can react to what is needed from the image or the apriori information of the image scenes. If required, both scan modes can be used simultaneously. Typically the multi-pixel imager pixels integrate light for the same amount of time so the multi-pixel imager can suffer from dynamic range limitations over the image. By time modulating the on/off state of the DMD micromirrors, the time duration that the chosen light is incident of the CCD can be controlled, thus improving the dynamic range of the overall imager. Instead of the multi-pixel imager, field programmable arrays (FPA) can also be used.

Because modern day electronics can easily implement data storage and time delay of electrical signals in real-time, the electrical signals from the photo-detectors (single point and CCDs/FPAs) can be delayed and then used for time delay signal processing allowing comparison of optical irradiance data during time-based scans, thus allowing data compressed image processing.

Beamsplitters 455 and 482 can be regular single wavelength band devices having the same color at the exits of the beamsplitter device or the wavelength bands can be different for the two dichroic beam splitters. Thus, single wavelength band imaging for both serial and parallel modes of the compressed data imager shown in FIG. 4 is possible. In addition, different bands wavelength imaging called hyperspectral imaging is also possible with the compressed data imager 400. The broadband light from the image can be allowed to fall on the broadband DMD micromirrors 440 and use electronically tunable wavelength selective filters at the two ports of the DMD switched beam states to select the wavelengths in time sequence that fall on the broadband detectors (both point-type and multi-pixel CCD/FPAs) placed in the compressed data imager. In this case, the beamsplitters 455 and 482 would be broadband beam splitter optical devices.

In summary, the compressed data optical imager 400 shown in FIG. 4 has at least five special features that can be used. The DMD single pixel serial scan mode can be used for high dynamic range processing and smart sensing such as compressed data image edge detection. Parallel image processing with the DMD multi-pixel selection mode can be used where at the same time a chosen subset of the original image on the DMD is selected and observed by a smaller pixel count CCD/FPA in comparison to a DMD giving high speed parallel scan operations with image data compression. The pixel (micromirror) or pixels (micromirrors) on the DMD can be time modulated in the serial or parallel imager modes to control the time duration of the light that falls on the time integrating point detector or multi-detector CCD/FPA to further improve the dynamic range of the overall imager. Relative time delay amongst the photo-detected electrical signals in the proposed imager can be introduced to study time scanned optical irradiance data from the image to deduce image effects such as edges, object motion, and the like. Alternatively, the DMD can be used as a 1×2 freespace optical switch to select the detection ports, and therefore photo-detectors active and wavelengths selected for operation of the compressed data imager.

A major motivation of a serial-parallel hybrid compressed imager design is that in many cases, the full image field has empty or unimportant image pixels and pixel locations and hence it is smart to select the smaller area information vital image zones and then send the reduced pixels information to the optical detection hardware such as the smaller pixel count CCD/FPA. In effect, an optical imager with image data compression has been realized without retaining all of the data in the original high pixel count image that is incident on the compressed data imager system. Thus, efficient use of image data for later data communications, storage, and processing has been disclosed.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:
1. A compressed data optical imager system comprising:
a movable reflecting optical device to reflect an optical image;
a controllable agile frontend imaging optics to provide an electronically controlled variable focal length optical path to pass the reflected optical image toward a digital micromirror device, the digital micromirror device reflecting a +θ optical beam and a −0 optical beam;

a +θ optical beam path and a −θ optical beam path to detect the +θ optical beam and −θ optical beams at two different wavelength bands;

a microprocessor based controller to execute a set of instructions to control the movable reflecting optical device and agile frontend imaging optics and receive an electronic image signal corresponding to a detected +θ optical beam and −θ optical beams at the two different wavelength bands.

2. The system of claim 1 wherein the agile frontend imaging optics comprises:

a movable reflecting optical device to reflect an input optical image; and an imaging lens serially coupled with an electronically controlled variable focus lens that provides a variable focal length by electronic control.

3. The system of claim 1 wherein the +θ optical beam path and −θ optical beam path each comprise:

a first beamsplitter to separate the +θ optical beam at a first wavelength from the +θ optical beam at a second different wavelength;

a second beamsplitter to separate the −θ optical beams at a first wavelength from the −θ optical beams at a second different wavelength; and a first and second photodetector to detect each of the +θ optical beam and −θ optical beams at the first wavelength and the +θ optical beam −θ optical beams at the second different wavelength and produce the electronic image signal in response to the detection.

4. The system of claim 3 wherein the photodetector in each of the +θ optical beam path and −θ optical beam path comprises:

a single or point photodetector that detects single pixel optical data from the corresponding first wavelength +θ optical beam or the −θ optical beams; and a multi-detector image sensing path having a multi-detector imaging sensor to detect a subset of the digital micromirror device image data from the corresponding second wavelength +θ optical beam or −θ optical beam.

5. The system of claim 4 wherein the multi-detector sensing path comprises:

an imaging lens to transmit the corresponding second wavelength +θ or −θ optical beam via a beam path mirror set where control of two mirror tilt angles of the mirror set physically translates the digital micromirror device selected optical image in two dimensions to place the selected optical image over a multi-detector imaging sensor.

6. The system of claim 5 wherein the microprocessor based controller controls a binary state micromirror tilt angle in time to control a selected image pixel detector integration time for a fixed integration time multi-detector imaging sensor.

7. The system of claim 1 wherein the digital micromirror device operates in a single pixel serial-scan mode for high dynamic range processing and smart sensing.

8. The system of claim 7 wherein the microprocessor based controller controls time modulation of an on/off state of the digital micromirror device micromirrors in the single pixel serial scan mode to control a time duration of the on state light incident on the multi-detector imaging sensor to improve a dynamic range of the compressed data optical imager.

9. The system of claim 1 wherein the digital micromirror device operates in a multiple-pixel parallel mode for parallel image processing wherein when a selected subset of an original image on the digital micromirror device is selected and observed by the multi-detector imaging sensor for high speed parallel scan operations with image data compression.

10. The system of claim 1 wherein the microprocessor based controller controls time modulation of an on/off state of the digital micromirror device micromirrors in the multiple-pixel parallel mode to control a time duration of the on state light incident on the multi-detector imaging sensor to improve a dynamic range of the compressed data optical imager.

11. The system of claim 1 wherein the set of instructions includes a first subset of instructions to introduce a relative time delay amongst the photo-detected electrical signals in to study a time scanned optical irradiance data from the image to deduce image effects.

12. The system of claim 1 wherein the set of instructions includes a second subset of instructions to control the digital micromirror device as a 1×2 freespace optical switch to activivate one or more detection ports of the multi-detector imaging sensor and select a wavelength of operation of the selected for operation of the multi-detector image sensing path.

* * * * *